Jan. 27, 1931.  R. W. SIEFFERT  1,790,601
CUTTING DEVICE FOR ENDS OF TUBES
Filed March 7, 1930  3 Sheets-Sheet 3
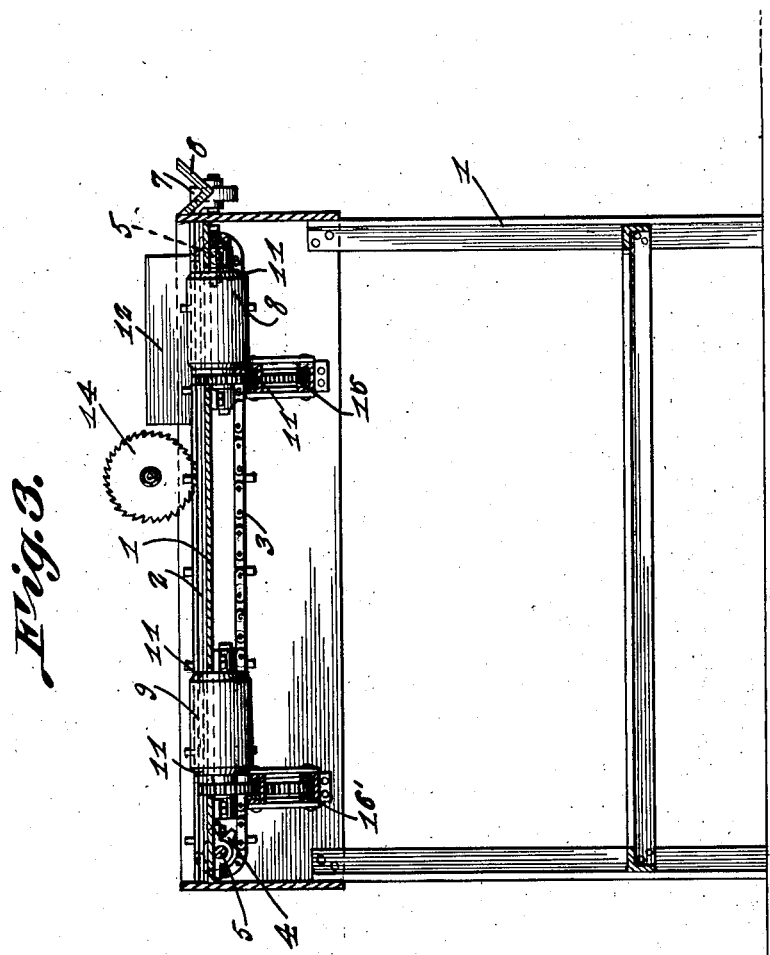

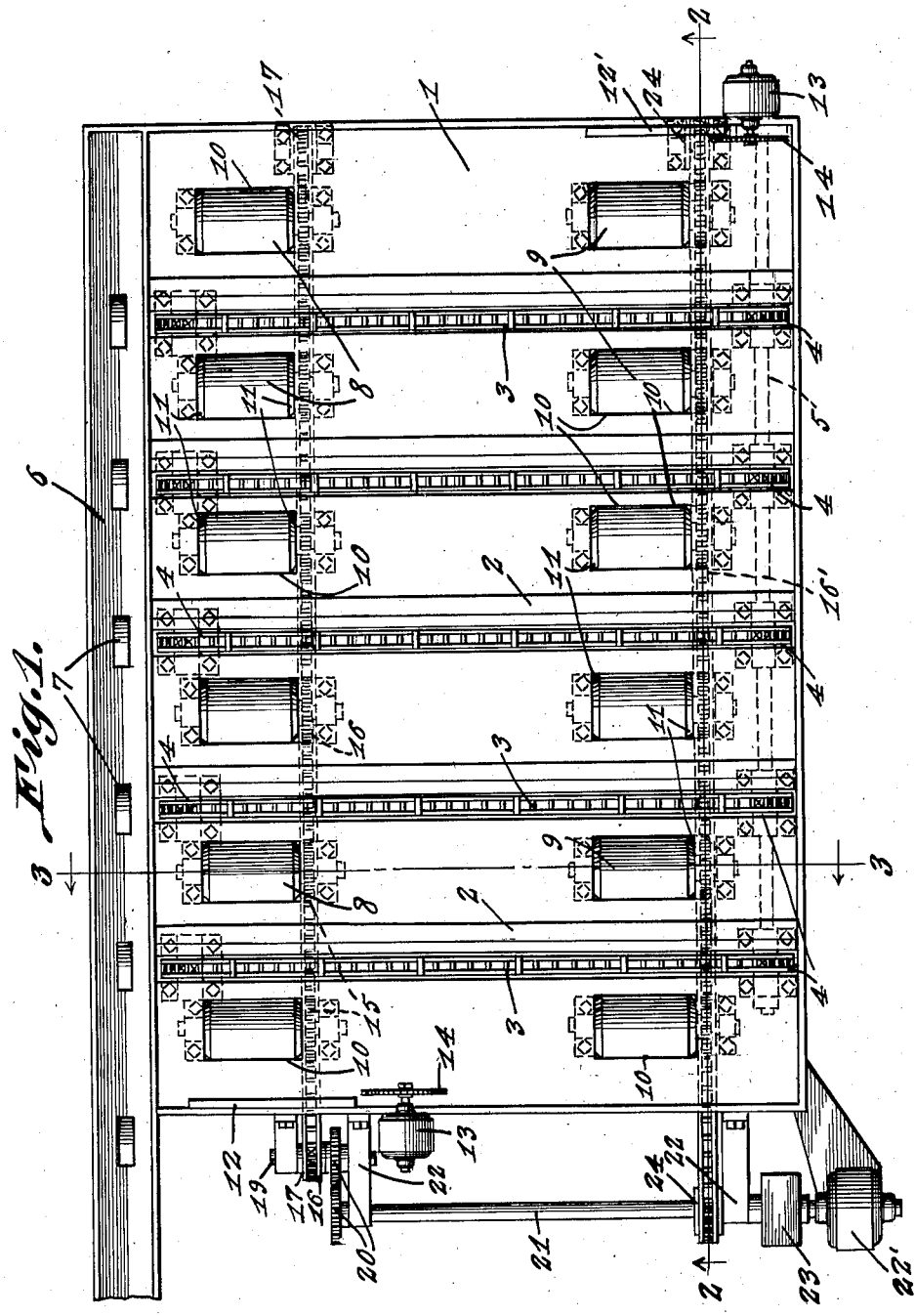

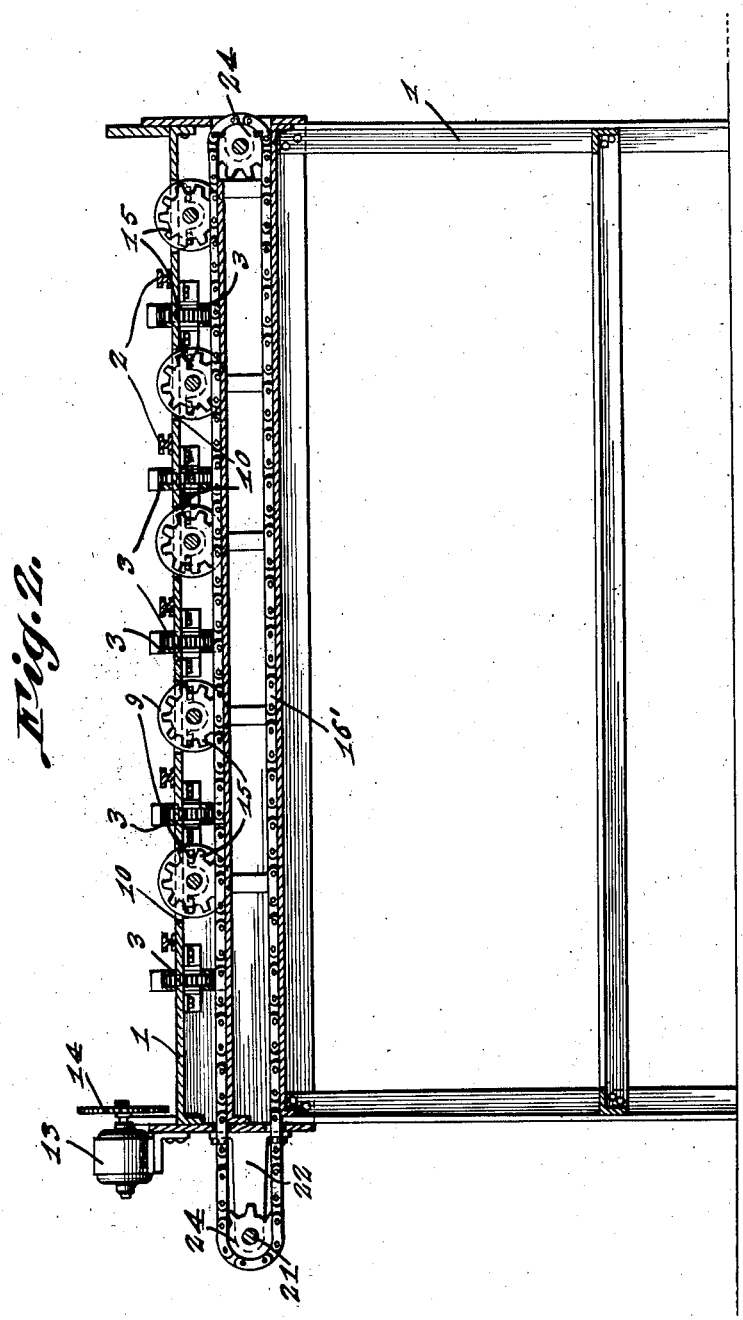

Patented Jan. 27, 1931

1,790,601

UNITED STATES PATENT OFFICE

RALPH W. SIEFFERT, OF ALIQUIPPA, PENNSYLVANIA

CUTTING DEVICE FOR ENDS OF TUBES

Application filed March 7, 1930. Serial No. 434,016.

This invention relates to means for cutting off the ends of tubes as they pass from the cooling table or the like to the threading machine or the like, the general object of the invention being to provide a table for receiving the tubes from the cooling table or the like, with conveying means on the table for conveying the tubes across the same and means on the table for moving the tubes longitudinally, first in one direction and then in an opposite direction, with cutting means at each end of the table for cutting the ends off the tubes, the longitudinal movements of the tubes bringing the ends of the tubes into engagement with the cutting means. Thus the ends of the tubes are cut off as the tubes pass from one device to another, so that the invention provides a labor saving device which eliminates the use of from six to twelve men.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a plan view of the invention.

Figure 2 is a section on line 2—2 of Figure 1.

Figure 3 is a section on line 3—3 of Figure 1.

In these views, the numeral 1 indicates a table on which the transversely arranged rails 2 are placed, and an endless conveyor chain 3 is placed adjacent each rail and parallels the same. These chains pass over sprockets 4 carried by the shafts 5, each shaft being arranged adjacent each side edge of the table, with openings in the table top through which the chains pass so that the upper reach of each chain is arranged on top of the table. These chains act to draw the tubes across the table and the rails provide supporting means for the tubes as they are moved over the table.

A trough 6 of V shape in cross section is placed at one side of the table and contains the rollers 7 and the tubes to be operated on are fed by this trough from the cooling table or the like to the apparatus forming the subject matter of this invention. Of course, other means can be provided for conveying the tubes to this apparatus, and automatic means may be provided for feeding the tubes on to the conveyor chains 3.

A row of rollers 8 is arranged at the front side of the table and a second row of rollers 9 is arranged at the rear side thereof, each roller being arranged adjacent a conveyor chain, the rollers being placed in openings 10 formed in the table top and said rollers extend slightly above the top plane of the rails. The ends of the rollers are beveled, as shown at 11, so that when a tube is brought against the beveled ends by the conveyors, the tubes will ride upon the rollers. The rollers 8 all revolve in one direction and the rollers 9 are revolved in the opposite direction so that a tube resting upon the rollers 8 will be moved toward the left in Figure 1, and a tube on the rollers 9 will be moved toward the right, but it will be understood that as this longitudinal movement of the tube is taking place, they are also being moved across the table by the conveyor chain. A stop plate 12 is placed on the table at the left of the row of rollers 8 for stopping the longitudinal movement of the tubes on these rollers, and a similar plate 12' is placed at the right end of the table to stop the longitudinal movement of the tubes on the rollers 9.

A motor 13 is arranged at each end of the table adjacent each stop plate and a saw 14 is fastened to the shaft of each motor, this saw acting to cut the ends off the tubes as they move from each stop plate, and as will be seen, the rollers 8 will move the tubes thereon against the plate 12 and then as the tubes move across the table under the action of the conveyors 3, the saw 14 will cut one end off of each tube. Then as the tubes reach the rollers 9, these rollers move the tubes against the stop plate 12' and finally the tubes are brought against the saw of the second motor so that the opposite ends of the tubes are cut off. Thus both ends of the tubes are cut off as they pass over the table.

A sprocket 15 is fastened to the shaft or pintle of each roller and an endless chain 16 engages the sprockets of the rollers 8 and a similar chain 16' engages the sprockets of the rollers 9. The chain 16 passes over the supporting sprockets 17, one of which is fastened to a stub shaft 19 journaled in a part of the table and which is connected by the gears 20 with the shaft 21 journaled in the brackets 22 fastened to one end of the table, this shaft 21 being driven from a motor 22' through suitable reducing gears placed in a housing 23. The chain 16' passes over the sprockets 24, one of which is placed on the shaft 21. Thus the two sets of rollers are driven by the same motor.

The conveyor chain can be driven in any suitable manner.

After passing from this table, the tubes can be conveyed to a threading machine, cooling vat or any other suitable device.

From the foregoing it will be seen that I have provided simple means for cutting off both ends of a tube as it passes across a table and this device will reduce labor, as it will eliminate from six to twelve workmen and it can be installed at low cost. By making the bearings for the rollers detachable, each bearing being held in position by two bolts, as shown in Figure 1, these rollers and their sprockets can be easily replaced by new ones when necessary.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A device of the class described comprising a table, conveying means thereon for conveying articles across the same, two sets of rollers carried by the table for moving the objects on the conveying means longitudinally, means for rotating one set of rollers in one direction and the other set in an opposite direction, a stop plate associated with each row of rollers for limiting the movement of the objects under the action of the rollers and cutting means at the rear of each stop plate for cutting the ends off the objects as they pass over the table.

2. A device of the class described comprising a table, conveying means thereon for conveying articles across the same, two sets of rollers carried by the table for moving the objects on the conveying means longitudinally, means for rotating one set of rollers in one direction and the other set in an opposite direction, a stop plate associated with each row of rollers for limiting the movement of the objects under the action of the rollers, cutting means at the rear of each stop plate for cutting the ends off the objects as they pass over the table and rails on the table paralleling the conveying means for slidingly supporting the objects conveyed by said means.

3. An apparatus of the class described comprising a table, spaced rails on the table top, endless conveyor chains having their upper reaches passing over the table top and parallel with the rails, means for supporting the chains, a row of rollers mounted in the table adjacent each side thereof, said rollers being parallel with the chains, with a roller placed between each pair of chains, each roller having its ends beveled whereby objects on the chains can ride upon the rollers, means for moving one set of rollers in one direction and the other set in the opposite direction, a stop plate associated with each row of rollers for limiting the movement of the objects under the action of said rollers and a motor driven saw at the rear end of each stop plate for cutting the ends off the objects.

In testimony whereof I affix my signature.

RALPH W. SIEFFERT.